United States Patent Office 2,821,226
Patented Jan. 28, 1958

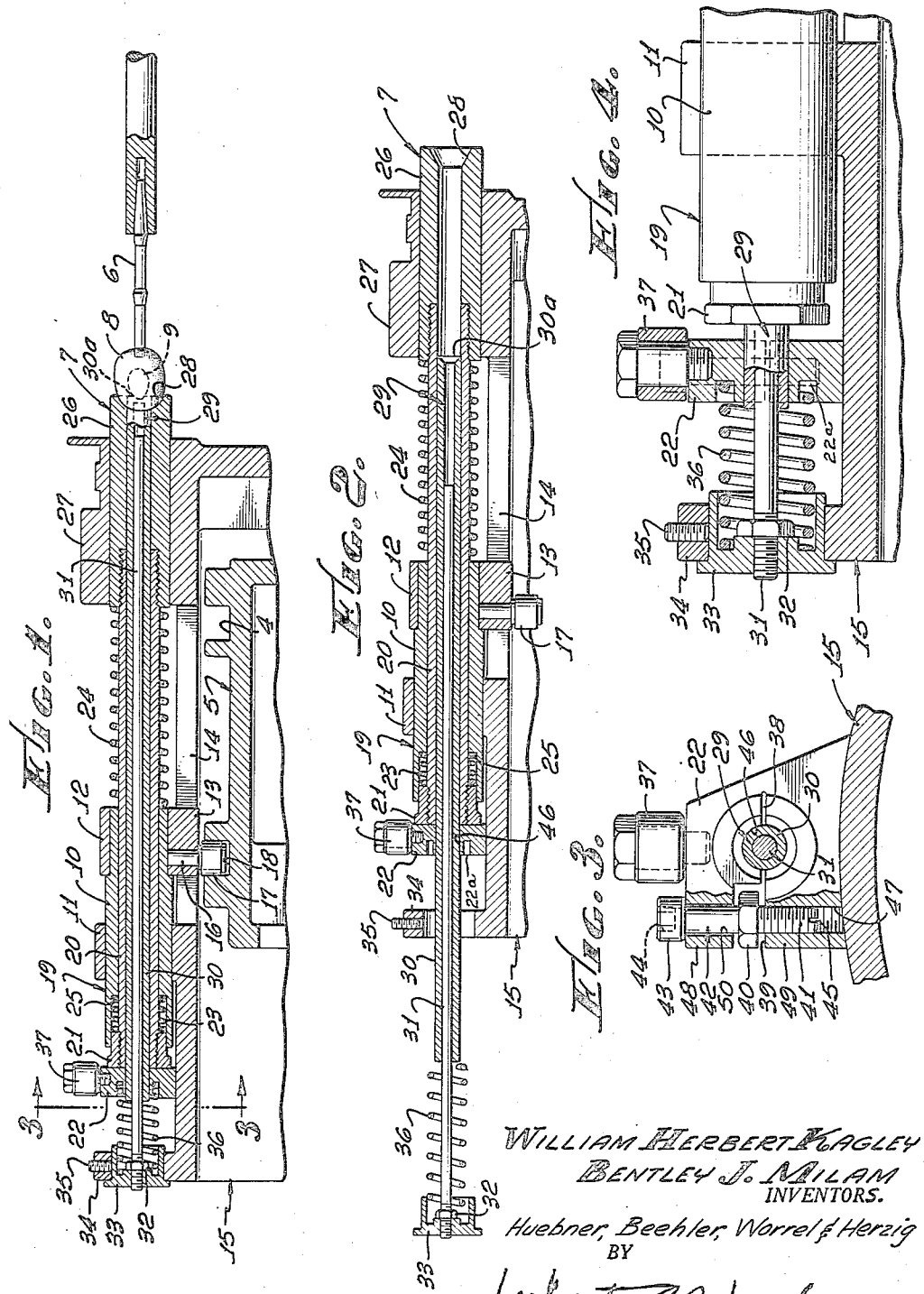

2,821,226

FRUIT PITTING MACHINE QUICK-CHANGE CORE TOOL ASSEMBLY

William Herbert Kagley, Lindsay, and Bentley J. Milam, Strathmore, Calif., assignors to Lindsay Ripe Olive Company, Lindsay, Calif., a corporation of California Application October 17, 1955, Serial No. 540,744

2 Claims. (Cl. 146—27)

The present invention relates to a machine for pitting fruit, such as olives, and in particular to improvements over certain features of the invention described and claimed in United States patent of Edward P. Drake, Fred J. Alberty, and William H. Kagley, No. 2,341,857, granted February 15, 1944, for Fruit Pitting Machine.

In removing pits from olives by a machine of the type identified above, the olives are individually, firmly grasped in a predetermined, aligned position while a punch enters from one end of the olive and is forced longitudinally therethrough. During this operation, the olive is forced against a reciprocating die by the punch. The olive pit is pushed out through the end of the olive by the punch into a bore in the die.

In the course of normal operation, ordinary wear and tear in the fruit pitting machine necessitates occasional maintenance and repair work. To facilitate this work, it is desirable that various parts of the machine be readily removed and replaced. The core tube assemblies from time to time should be removed, serviced, and replaced. Occasional breakage necessitates such replacement.

Accordingly, it is an important object of this invention to provide in a machine of this general character, a core tube assembly which is designed for conveniently and rapidly making core tube assembly changes in connection with repair and maintenance work.

Another object is to provide in such a machine a core tube assembly which minimizes the possibility of breakdown and reduces the necessity of replacement and repair work in connection with the core tube assembly.

Other objects and advantages will appear from the further description in the specification and the illustration in the drawing.

In the drawing:

Figure 1 is a detailed longitudinal section of a die, coring tool, fragment of a punch, and immediately associated parts with the parts in a position just after receiving an olive at which the coring tool has advanced to make a deep incision in the olive;

Figure 2 is a view similar to that of Figure 1 showing the partial removal of a core tube assembly;

Figure 3 is an enlarged sectional view taken on line 3—3 of Figure 1, with portions broken away, showing a core tube block or thrust collar embodying a novel feature of the present invention; and Figure 4 is an enlarged view of a portion of Figure 1 showing details of the core tube block.

Punches 6 and dies 7 of the fruit pitting machine are mounted circumferentially in spaced relationship with respect to each other on each of two drums 15 (part of one is shown). The punches and dies are arranged on the peripheral regions of the drums 15 in alternating relationship. The drums, in turn, are rotatably mounted in axially spaced relationship with respect to each other so that the punches on one drum are positioned axially opposite the dies on the other drum, and the dies on the first-mentioned drum are axially opposite the punches on the second-mentioned drum. This is accomplished by rigidly connecting the two axially spaced drums so that they rotate together as a unit. A motor (not shown), and a gear train (not shown), connecting one of the drums 15 to the motor, are used to furnish the power for rotating the drums together as a unit.

A cam barrel 5 is fixedly mounted inside each of the drums concentrically therewith. The cam barrels are provided with die cam raceways 18 and punch cam raceways 4 to control the cyclic extension and retraction movements of the punches 6 and dies 7 through punch cam followers (not shown) and die cam followers 17.

The olives to be pitted are spaced and aligned in chute means and fed to olive gripping means (not shown) which firmly grasp individual olives and align each olive 8 in a predetermined position between each pair of oppositely oriented punches 6 and dies 7. During the continuous cyclic operation of the fruit pitting machine, the punch 6 enters the olive 8 from one end and is forced longitudinally therethrough. The punch 6 forces the olive 8 against the die 7 and the pit 9 is pushed out through the end of the olive, while the olive is supported by the die, into a central bore passing through the die. The pit 9 and the pitted olive are separately expelled from the fruit pitting machine and are collected in separate receptacles.

Each die assembly includes an outer sleeve 10 slidably fitting in the bearing 11. A collar 12 encloses a portion of the sleeve and is attached thereto. This collar has a rectangular shank 13, which is arranged to slide in a longitudinal guide slot 14 in the drum 15. Extending from the shank is a stub shaft 16 upon which is mounted a roller or die cam follower 17, which extends into the die cam raceway 18 formed on the outer surface of the stationary cam barrel 5. The die cam follower 17 engages the raceway of the die cam 18 as the drum rotates carrying with it the die assemblies. The roller or cam follower 17 travels through the raceway over a varying contour during repeated cycles of operations. During these cycles the drum 15 rotates around the die cam 18, the stationary cam barrel 5 being mounted concentrically inside the rotatably mounted drum.

Slidably mounted within the sleeve 10 is an inner sleeve 20 which has a stop nut 21 at the rear end thereof. A helical compression spring 23 is disposed within the rearward end of the sleeve 10 around inner sleeve 20. The spring 23 serves to take up shock that may act on the rear end of the die assembly and to thus prevent any damage thereto or any shearing of threads of the nut 21. Without the spring 23 such damage may occur on unusually rapid forward motion of the inner sleeve 20 under the influence of a spring 24 after being highly compressed and suddenly giving way on an accidentally misaligned olive or on an olive that is abnormally hard to pit. In such cases, the inner end of the spring 23 engages an annular shoulder 25 inside sleeve 10 displaced inward from the rearward end thereof. The outer end of the spring 23 is engaged by the inner end of nut 21 as it plunges into the rearward end of sleeve 10, and the spring 23 cushions this action to protect nut 21 from injury.

The forward end of the inner sleeve 20 extends through and beyond the end of the outer sleeve 10. At the forward end of the inner sleeve is threaded a forward die member 26, which is slidable in flange 27. The extreme outer end of the die member 26 is countersunk to form an olive receiving cup 28. The compression spring 24 encloses that portion of the inner sleeve 20 between the rear end of the die member 26 and the forward end of collar 12 to keep the forward die member 26 and the rearward die member 19 normally separated, and to cause the die member 26 to be normally advanced upon forward movement of the collar 12 under influence of the cam raceway 18. Retraction of the die member 26 is accomplished by engagement of the inner shoulder 25 near the rear end of the outer sleeve 10 with the inner end of the spring 23, the outer end of which in turn engages the nut 21 threaded on the inner sleeve 20.

Slidably fitting in the bore of the inner sleeve 20 is the coring tool 29. This comprises a sleeve 30 slidably mounted on a rod 31. The rear end of the sleeve 30 is clamped in the thrust collar or core block 22 and the rod 31 threadedly mounted in a cap 33 aided by a lock nut 32. This cap is retained in the flange 34 by a set screw 35. The forward end of the sleeve 30 is formed with a circular cutting knife edge 30a.

A compression spring 36 encloses the rod 31 and extends between the cap 33 and the thrust collar or core block 22 normally urging the collar or block forward away from the cap 33. The thrust collar is formed with an annular groove 22a spaced from and concentric with a bore 46, in which groove one end of the compression spring 36 is seated.

At the upper part of the collar or block 22 is mounted a roller 37, which engages an auxiliary cam (not shown). This cam serves to retract the coring tool 29 after completion of the pitting operation by the punch 6. Subsequently, nut 21 is brought into thrust engagement with thrust collar 22, which holds the coring tool 29 in its fully retracted position until it is again urged forward by the compression spring 36 at the proper point in the cycle of operations, as previously described, when the movement of the cam follower 17 causes the die 7 to move forward to engage another olive.

The collar or block 22 is split horizontally at 38 with an enlarged slot at 39 to accommodate a nut 40. The nut 40 preferably is turned tightly against the shank of a bolt 42 at the upper end of the threaded portion 41 thereof. The bolt 42 preferably is a vertically disposed bolt having a head 43 provided with a recessed drive 44. The opposite end of the shank of the bolt preferably is provided with a screw driver slot 45. The collar or block 22 is formed with the transverse bore 46 above referred to, which is centered on the slit 38, and is made of a diameter so that it can accommodate the sleeve 30. The thrust collar 22 thus may be said to comprise a bifurcated block having terminal legs provided by the split 38 as enlarged by the bore 46 which latter comprises smooth cylindrical surfaces embracing the coring tool sleeve.

The end of the coring tool sleeve is frictionally clamped tight by a squeeze action in bore 46 of the collar or block by turning bolt 42 in hole 50 with a socket wrench engaged in recessed drive 44, into threaded engagement with tapped hole 47. Tightening of bolt 42 draws together the jaws 48 and 49 of split collar or block 22 until the walls of bore 46 clamp the end of sleeve 30 tightly in a fixed position in the block. (It will be observed that the end of sleeve 30 does not carry a threaded portion and is not threaded into collar or block 22 as in the case of the assemblies in the fruit pitting machine of the Patent No. 2,341,857 referred to above.)

By using the thrust collar 22, the removal and replacement of the coring tool assembly is greatly facilitated. The bolt 42 conveniently can be loosened by turning recessed drive 44 with a socket wrench. Loosening of bolt 42 initially causes the jaws 48 and 49 of collar 22 to spread apart to their normal, unclamped position. Further loosening of bolt 42 causes the jaws of collar 22 to be pried apart as nut 40 provides a shoulder which engages the bottom of upper jaw 48, and threaded portion 41 unscrews from tapped hole 47 in lower jaw 49. Then the sleeve 30 is freed and readily can be slipped through the bore 46 in the collar.

Set screw 35 in flange 34 then is loosened so that cap 33 can be drawn from flange 34, as shown in Figure 2. The coring tool assembly consisting of cap 33, lock nut 32, compression spring 36, ejector rod 31, and sleeve 30 is then readily withdrawn rearward from the die assembly, as shown in Figure 2.

A new or repaired replacement coring tool assembly then readily can be inserted into the die assembly from the rear. The end of sleeve 30 of the replacement coring tool assembly is tightened in the bore 46 of collar 22 by tightening bolt 42, with a socket wrench engaged in recessed drive 44. Cap 33 of the replacement assembly is tightly mounted in flange 34 by tightening set screw 35. The replacement coring tool assembly is thus mounted for action.

The use of a squeeze action, or clamping action, in collar 22 on sleeve 30, instead of the use of a threaded connection between the collar and the sleeve, has been found to facilitate the removal and replacement of coring tool assemblies to the point where only about $\frac{1}{10}$ of the former time is required for these operations. This modification also has virtually eliminated breakdown of these units which occurred at the threaded connection between the end of the sleeve 30 and the collar 22.

Occasionally, there may be breakage of the bolt 42 below nut 40. In such cases, the nut 40 is readily unscrewed from the threaded fragment connected to head 43, and threaded portion 41 of the bolt is conveniently removed from tapped hole 47 by a screw driver engaged in slot 45. By using the coring tool assembly of the invention, maintenance, repair costs, and machine downtime have been considerably reduced with a resulting corresponding increase in efficiency and production at reduced cost.

While we have herein shown and described our invention in what we have conceived to be the most practical and preferred emodiment, it is recognized that departures may be made therefrom within the scope of our invention, which is not to be limited to the details disclosed herein, but is to be accorded the full scope of the claims so as to embrace any and all equivalent apparatus.

What we claim as our invention is:

1. In a fruit pitting machine the combination of a fruit receiving die, a cylindrical coring tool axially slidable within the fruit receiving die, a thrust collar surrounding one end of the coring tool outwardly of the rear end of said die; said thrust collar comprising a bifurcated block having terminal legs and smooth cylindrical surfaces embracing said coring tool, means engaging the legs for drawing said legs together to frictionally bind said thrust collar on said coring tool, one face of said thrust collar having an annular groove spaced from and concentric with said cylindrical surfaces, and a compression spring having one end thereof seated in said groove.

2. A machine as defined in claim 1 wherein said means is a screw threaded through one of said legs and slidable through the other, said screw having a shoulder thereon, between said legs, and engageable with said other leg to forcibly spread said legs apart.

References Cited in the file of this patent

UNITED STATES PATENTS

| | | |
|---|---|---|
| 2,057,542 | Slavins | Oct. 13, 1936 |
| 2,324,533 | Pearson et al. | July 20, 1943 |
| 2,341,857 | Drake et al. | Feb. 15, 1944 |
| 2,577,714 | Proff | Dec. 4, 1951 |